(12) United States Patent
Yerli

(10) Patent No.: US 11,196,964 B2
(45) Date of Patent: Dec. 7, 2021

(54) MERGED REALITY LIVE EVENT MANAGEMENT SYSTEM AND METHOD

(71) Applicant: THE CALANY HOLDING S. À R.L., Luxembourg (LU)

(72) Inventor: Cevat Yerli, Frankfurt am Main (DE)

(73) Assignee: THE CALANY Holding S. À R.L., Luxembourg (LU)

( * ) Notice: Subject to any disclaimer, the term of this patent is extended or adjusted under 35 U.S.C. 154(b) by 0 days.

(21) Appl. No.: 16/903,239

(22) Filed: Jun. 16, 2020

(65) Prior Publication Data

US 2020/0404218 A1 Dec. 24, 2020

Related U.S. Application Data

(60) Provisional application No. 62/863,171, filed on Jun. 18, 2019.

(51) Int. Cl.
*H04N 7/15* (2006.01)
*G06T 19/00* (2011.01)
(Continued)

(52) U.S. Cl.
CPC ............ *H04N 7/157* (2013.01); *G06F 9/453* (2018.02); *G06F 16/2379* (2019.01);
(Continued)

(58) Field of Classification Search
CPC ............ H04N 7/15; G06T 19/00; H04L 29/06
(Continued)

(56) References Cited

U.S. PATENT DOCUMENTS

| 5,883,817 A | 3/1999 | Chisholm |
| 5,956,039 A * | 9/1999 | Woods .................... H04L 29/06 345/419 |

(Continued)

FOREIGN PATENT DOCUMENTS

| CN | 100484726 C | 5/2009 |
| CN | 102120325 B | 12/2012 |

(Continued)

OTHER PUBLICATIONS

"Walmart Patent Wants You to Shop at Home Using Virtual Reality," Research Brief, Aug. 17, 2018, <https://www.cbinsights.com/research/walmart-virtual-reality-retail-patent/> [retrieved Jun. 5, 2020], 8 pages.

(Continued)

*Primary Examiner* — Melur Ramakrishnaiah
(74) *Attorney, Agent, or Firm* — Christensen O'Connor Johnson Kindness PLLC

(57) ABSTRACT

An accurate and flexible merged reality system and method configured to enable remotely viewing and participating in real or virtual events. In the merged reality system, at least one portion of the real or a virtual world may be respectively replicated or streamed into corresponding sub-universes comprised within the virtual world system, wherein some of the sub-universes comprise events that guests may view and interact with from one or more associated guest physical locations. Other virtual elements, such as purely virtual objects or graphical representations of applications and games, can also be included in the virtual world system. The virtual objects comprise logic, virtual data and models that provide self-computing capabilities and autonomous behavior. The system enables guests to virtually visit, interact and make transactions within the event through the virtual world system.

20 Claims, 8 Drawing Sheets

(51) Int. Cl.
| | |
|---|---|
| *H04L 29/06* | (2006.01) |
| *G06T 7/70* | (2017.01) |
| *G06F 9/451* | (2018.01) |
| *G06F 16/23* | (2019.01) |
| *G06N 20/00* | (2019.01) |
| *G06F 16/9535* | (2019.01) |
| *H04L 29/08* | (2006.01) |
| *G06T 15/20* | (2011.01) |
| *G06T 17/00* | (2006.01) |
| *G06T 17/10* | (2006.01) |
| *G06Q 20/12* | (2012.01) |

(52) U.S. Cl.
CPC ......... *G06F 16/9535* (2019.01); *G06N 20/00* (2019.01); *G06T 7/70* (2017.01); *G06T 15/205* (2013.01); *G06T 17/005* (2013.01); *G06T 17/10* (2013.01); *G06T 19/006* (2013.01); *H04L 65/4069* (2013.01); *H04L 65/4076* (2013.01); *H04L 67/10* (2013.01); *G06Q 20/123* (2013.01); *G06T 2219/024* (2013.01)

(58) Field of Classification Search
USPC ............................................ 348/14.01–14.16
See application file for complete search history.

(56) References Cited

U.S. PATENT DOCUMENTS

| | | | |
|---|---|---|---|
| 6,278,479 | B1 | 8/2001 | Wilson et al. |
| 6,556,206 | B1 | 4/2003 | Benson et al. |
| 7,168,051 | B2 | 1/2007 | Robinson et al. |
| 7,529,690 | B2 | 5/2009 | Hadi |
| 8,326,704 | B2 | 12/2012 | Glazer et al. |
| 8,564,621 | B2 | 10/2013 | Branson |
| 9,281,727 | B1* | 3/2016 | Coley .................. G06F 3/0416 |
| 9,511,291 | B2 | 12/2016 | Lyons et al. |
| 9,669,321 | B2 | 6/2017 | Reveley |
| 9,704,298 | B2 | 7/2017 | Espeset et al. |
| 9,721,386 | B1 | 8/2017 | Worley, III et al. |
| 10,565,764 | B2 | 2/2020 | Han et al. |
| 2002/0116235 | A1 | 8/2002 | Grimm et al. |
| 2002/0191017 | A1* | 12/2002 | Sinclair .................. A63F 13/12 |
| | | | 715/740 |
| 2003/0030658 | A1 | 2/2003 | Gibbs et al. |
| 2006/0122917 | A1 | 6/2006 | Lokuge et al. |
| 2006/0184886 | A1 | 8/2006 | Chung et al. |
| 2007/0168463 | A1 | 7/2007 | Rothschild |
| 2008/0263460 | A1 | 10/2008 | Altberg et al. |
| 2009/0055019 | A1 | 2/2009 | Stiehl et al. |
| 2009/0244059 | A1 | 10/2009 | Kulkarni et al. |
| 2009/0326713 | A1 | 12/2009 | Moriya |
| 2010/0131865 | A1 | 5/2010 | Ackley et al. |
| 2010/0131947 | A1 | 5/2010 | Ackley et al. |
| 2011/0060425 | A1 | 3/2011 | Freed |
| 2012/0038667 | A1 | 2/2012 | Branson et al. |
| 2012/0105475 | A1 | 5/2012 | Tseng |
| 2012/0133638 | A1* | 5/2012 | Davison .................. G06T 19/00 |
| | | | 345/419 |
| 2012/0149349 | A1 | 6/2012 | Quade |
| 2013/0009994 | A1 | 1/2013 | Hill |
| 2013/0044106 | A1 | 2/2013 | Shuster et al. |
| 2013/0117377 | A1 | 5/2013 | Miller |
| 2013/0179576 | A1 | 7/2013 | Boldyrev et al. |
| 2014/0063061 | A1 | 3/2014 | Reitan |
| 2014/0214504 | A1* | 7/2014 | Young .................. G06Q 50/01 |
| | | | 705/14.5 |
| 2014/0221090 | A1 | 8/2014 | Mutschler et al. |
| 2014/0282220 | A1 | 9/2014 | Wantland et al. |
| 2015/0188984 | A1 | 7/2015 | Mullins |
| 2016/0300392 | A1 | 10/2016 | Jonczyk et al. |
| 2016/0343168 | A1 | 11/2016 | Mullins et al. |
| 2016/0379415 | A1 | 12/2016 | Espeset et al. |
| 2017/0092223 | A1 | 3/2017 | Fain et al. |
| 2017/0203438 | A1 | 7/2017 | Guerin et al. |
| 2017/0243403 | A1 | 8/2017 | Daniels et al. |
| 2017/0250930 | A1 | 8/2017 | Ben-Itzhak |
| 2017/0286572 | A1 | 10/2017 | Hershey et al. |
| 2017/0287496 | A1 | 10/2017 | Heitkamp et al. |
| 2017/0289202 | A1 | 10/2017 | Krasadakis |
| 2017/0358024 | A1 | 12/2017 | Mattingly et al. |
| 2018/0040038 | A1* | 2/2018 | Vanslette ................ H04W 4/02 |
| 2018/0047093 | A1 | 2/2018 | High et al. |
| 2018/0060948 | A1 | 3/2018 | Mattingly et al. |
| 2018/0089903 | A1 | 3/2018 | Pang |
| 2018/0173309 | A1 | 6/2018 | Uchiyama et al. |
| 2018/0210436 | A1 | 7/2018 | Burd et al. |
| 2018/0231973 | A1 | 8/2018 | Mattingly et al. |
| 2018/0281193 | A1 | 10/2018 | Favis |
| 2018/0342106 | A1 | 11/2018 | Rosado |
| 2018/0349108 | A1 | 12/2018 | Brebner |
| 2019/0065028 | A1 | 2/2019 | Chashchin-Semenov et al. |
| 2019/0102494 | A1 | 4/2019 | Mars |
| 2019/0102709 | A1* | 4/2019 | Correa .................. G06N 20/00 |
| 2019/0221036 | A1* | 7/2019 | Griffin .................. A63F 13/211 |
| 2019/0361589 | A1 | 11/2019 | Yerli |
| 2019/0361797 | A1 | 11/2019 | Yerli |
| 2020/0175759 | A1 | 6/2020 | Russell et al. |
| 2020/0209949 | A1 | 7/2020 | Noris et al. |
| 2020/0210137 | A1 | 7/2020 | Noris et al. |
| 2020/0211251 | A1 | 7/2020 | Noris et al. |
| 2020/0349735 | A1 | 11/2020 | Dine et al. |

FOREIGN PATENT DOCUMENTS

| | | |
|---|---|---|
| DE | 101 28 015 A1 | 12/2001 |
| DE | 10 2005 011 126 A1 | 9/2006 |
| JP | 2005539296 A | 12/2005 |
| JP | 2015502584 A | 4/2013 |
| JP | 2016110245 A | 9/2016 |
| JP | 2016209969 A | 12/2016 |
| KR | 1020180020725 A | 4/2019 |
| WO | 02/063454 A1 | 8/2002 |
| WO | 2008/065458 A2 | 6/2008 |
| WO | 2008/065458 A3 | 6/2008 |
| WO | 2009/029559 A1 | 3/2009 |
| WO | 2013/050473 A1 | 4/2013 |
| WO | 2016/017254 A1 | 2/2016 |
| WO | 2016/077493 A8 | 5/2016 |
| WO | 2016/164178 A1 | 10/2016 |
| WO | 2017/141391 A1 | 8/2017 |
| WO | 2018/074000 A1 | 4/2018 |
| WO | 2019/079826 A1 | 4/2019 |

OTHER PUBLICATIONS

European Search Repod dated Jan. 17, 2020, in European Application No. 19176436.4, filed May 24, 2019, 33 pages.
Massachusetts Institute of Technology, "Huggable", Jul. 17, 2013, <http://www.youtube.com/watch?v=Z-8_RhkdvoA> [retrieved Sep. 6, 2019], 2 pages.
Partial European Search Report dated Sep. 9, 2019, in European Application No. 19176436.4, filed May 24, 2019, 18 pages.
Alsamhi, S.H., et al., "Artificial Intelligence-Based Techniques for Emerging Robotics Communication: A Survey and Future Perspectives", Arxiv.Org, Cornell University Library, 201 Olin Library, Cornell University Ithaca, New York, Apr. 25, 2018, pp. 1-10.
Office Action dated Aug. 24, 2020, issued in U.S. Appl. No. 16/903,239, filed Jun. 16, 2020, 19 pages.
Extended European Search Report dated Sep. 14, 2020, issued in European Application No. 20176245.7, 8 pages.
European Search Report dated Nov. 18, 2020, issued in European Application No. 20180856.5, 12 pages.
European Search Report dated Nov. 17, 2020, issued in European Application No. 20180736.9, 13 pages.
European Search Report dated Oct. 27, 2020, issued in European Application No. 20180712.0, 11 pages.
Extended European Search Report dated Nov. 16, 2020, issued in European Application No. 20180885.4, 12 pages.

(56) References Cited

OTHER PUBLICATIONS

Extended European Search Report dated Nov. 18, 2020, issued in European Application No. 20180723.7, 12 pages.
Extended European Search Report dated Nov. 19, 2020, issued in European Application No. 20180869.8, 9 pages.
Microsoft Developer: "Developing Mobile Augmented Reality (AR) Applications with Azure Spatial Anchors—BRK2034", May 14, 2019 (May 14, 2019), pp. 1-8, XP54981052, Retrieved from the Internet: URL:https://www.youtube.com/watch?v=CVmfP8TaqNU [retrieved on Oct. 30, 2020].
Office Action dated Jan. 11, 2021, issued in U.S. Appl. No. 16/903,235, filed Jun. 16, 2020, 26 pages.
Yang, X., et al., "Virtual Reality Tools for Internet-Based Robotic Teleoperation", Proceedings of the Eighth IEEE International Symposium on Distributed and Real-Time Applications, 2004, 5 pages.
Asanuma, K., et al., "User Interface for Remote Operation of a Moving Robot via Internet", 9 pages.
Office Action dated Feb. 17, 2021, issued in U.S. Appl. No. 16/904,213, filed Jun. 16, 2020, 18 pages.
Extended European Search Report dated Oct. 17, 2019, issued in European Application No. 19176426.5, filed May 24, 2019, 9 pages.
Korean Office Action dated May 26, 2020, issued in KR Application No. 10-2019-0060412, filed May 23, 2019, 13 pages.
Rajappa et al., "Application and Scope Analysis of Augmented Reality in Marketing using Image Processing Technique" (2016).
Office Action dated Aug. 6, 2020, in U.S. Appl. No. 16/421,155, filed May 23, 2019, 26 pages.
Office Action dated Feb. 12, 2021, in U.S. Appl. No. 16/421,155, filed May 23, 2019, 26 pages.
Office Action dated Nov. 19, 2020, issued in Japanese Application No. 2019096980, 42 pages.
WEB+DB PRESS, vol. 32, May 25, 2006, ISBN 4-7741-2752-3, p. 10-17.
Yoshiyuki Hashimoto, "iOS iBeacon/GeoFence/Navi/CoreMotion/M7" (Japanese version), Mar. 1, 2014, ISBN 978-4-7980-4070-7, pp. 82-94.
Micheal Lanham, "Unity AR" (Japanese version), Sep. 1, 2017, ISBN 978-4-87311-810-9, 26 pages.
Jeffrey Richter, "Windows Runtime" (Japanese version), Jun. 9, 2014, ISBN 978-4-8222-9831-9, pp. 291-300.
Office Action dated Apr. 26, 2021, issued in U.S. Appl. No. 16/903,227, filed Jun. 16, 2020, 40 pages.
Klas et al., "VR is on the Edge: How to Deliver 360° Videos in Mobile Networks," VR/AR Network '17, ACM, Aug. 2017, pp. 30-35.
Foley et al., "KD-Tree Acceleration Structures for a GPU Raytracer," Graphics Hardware 2005, ACM, Jul. 2005, pp. 15-22.
DiVerdi et al., "Level of Detail Interfaces," Proc. Third IEEE and ACM Int'l Conf. on Mixed and Augmented Reality (ISMAR 2004), 2 pages.

* cited by examiner

MERGED REALITY LIVE EVENT MANAGEMENT SYSTEM AND METHOD

CROSS-REFERENCE TO RELATED APPLICATIONS

This application claims the benefit of Provisional Application No. 62/863,171, filed Jun. 18, 2019, the entire disclosure of which is hereby incorporated by reference herein for all purposes.

BACKGROUND

Remote viewing of events has typically taken the form of physically being present at the event as part of local audience, watching the event through a screen (e.g., on a device such as a television, personal computer or smart phone), recording the event for later consumption through a device, or live-streaming the event.

Typically, in case of the events being streamed live, they are streamed on-demand by a server to the devices requesting the media content. However, the nature of the media streams is usually in two dimensions and the ability of interacting with the different elements within the media streams is limited mostly to observing them.

Technology developments have led to the creation of virtual worlds, which are a simulated environment providing a graphical and physical representation of either a real or imaginary world, where users can interact with each other or with other elements via avatars, or virtual replicas of each other. However, most elements of a virtual world nowadays do not allow any type of interaction or autonomous behavior, limiting the ability of users to interact with them.

Therefore, developments in the field of remote viewing and participating in events through novel applications and architectures of virtual worlds are required.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present disclosure generally relates to computer systems, and more specifically to a system and method enabling visualizing virtual or real events in remote locations by providing the events in augmented or virtual reality.

A system of the current disclosure comprises at least one server of a cloud server computer system comprising at least one processor and memory storing a virtual world system comprising a plurality of sub-universes, each sub-universe representing at least one portion of the real world or of a virtual world, wherein at least one sub-universe hosts a real or virtual event. The system further comprises an event management system connected to the virtual world system and configured to manage event sharing rules on a per sub-universe basis.

The event management system is configured to associate one or more user devices and one or more guest physical locations with the real or virtual event through the corresponding virtual world system sub-universe and to detect, through a network, the one or more user devices accessing at least one guest physical location associated with the real or virtual event. Said detecting triggers the event management system to share with the one or more user devices and the at least one guest physical location, based on the event sharing rules, the sub-universe hosting the real or virtual event.

In some embodiments, the virtual world system comprises virtual objects that include at least one of a virtual replica of a real-world element, a purely virtual object, an application, or a combination thereof. The virtual objects comprise virtual data and models, which may provide the virtual objects with self-computing capabilities and autonomous behavior.

In some embodiments, the virtual replicas include logic, virtual data and models that may be input through a plurality of software platforms, software engines, and/or sensors connected to connected devices. In some embodiments, suitable models comprise one or more of a 3D model, dynamic model, geometric model, and machine learning model. The models and data may be input via a plurality of external platforms or engine services included in the virtual world system. The plurality of external platforms may include, for example, an Internet of Things (IoT) platform, a machine learning (ML) platform, a big data platform or a simulation platform. External platforms may connect to the virtual world system through application programming interfaces (APIs) and software development kits (SDKs), in order to provide and manipulate models and data of the virtual objects. The engine services included in the virtual world system may include artificial intelligence, simulation, 3D and haptic features, amongst others. The virtual world system also connects to a spatial data streaming platform configured to receive and manage spatial data from the real-world elements and also from their virtual replicas and/or other virtual objects. The system may further comprise digital reality interfaces, such as virtual reality, augmented reality, and merged reality interfaces. These interaction interfaces and mechanics are defined through the use of computer code included in computer scripts and programs, and may be affected by applications (e.g., distributed applications) smart contracts, and the like, available in the virtual world system where the interactions take place, digitally codifying possible and desired interactions between all or most elements of the real world in a predetermined area and the virtual world, resulting in one view of the merged interactive reality.

The geometric model comprises the mathematical model defining the shape of the virtual replica based on the real-world element. The 3D model goes in hand with the geometric model to show data included in each of the geometries of the virtual replica, such as textures, colors, shading, reflection, lighting, collision effects. The 3D models comprise the 3D data structure that is used to visually represent the virtual replicas and other virtual elements in the virtual world system, such as applications, ads, virtual bots, etc. The 3D data structure may include, for example, one or more octrees, such as sparse voxel octrees or dense voxel trees, which may be suitable for virtualizing the world into the persistent virtual world system through 3D scanning techniques. However, other data structures may further be included, such as quadtrees, BSP trees, 3D arrays, kD trees, point clouds, wire-frames, boundary representations (B-Rep), constructive solid geometry trees (CSG Trees), bintrees, and hexagonal structures. The 3D data structure serves the function of accurately and efficiently representing the data of each of the geometries of the virtual objects in the persistent virtual world system.

The dynamic model represents the mathematical model describing the behavior of the real-world objects in the virtual world along with other virtual objects over time, may comprise a set of states that occur in a defined sequence, and may comprise continuous (e.g., algebraic or differential equations) and discrete (e.g., as state-machine or stochastic models) dynamics models.

The machine learning model is a mathematical representation of the real-world objects and processes, normally generated by a machine learning algorithm based on actual or simulated data that have been used as training data to learn from. This model may enable implementation of artificial intelligence techniques that can be used to optimize the operation and/or performance of the real-world element through the virtual replica. The machine learning model may employ machine learning algorithms that allow teaching a virtual replica or other virtual object about the behavior of a real-world element in order to simulate the behavior of the real-world element.

In some embodiments, the virtual world system includes a plurality of virtual objects, wherein the virtual objects include virtual data and models. The models used in the virtual objects consider the level of detail (LOD) required by a specific scenario computation. LOD involves decreasing the complexity of a model representation as the virtual objects moves away from the viewer, or according to other metrics such as object importance, viewpoint-relative speed, or position. In some embodiments, LOD is further adjusted to individual viewers depending on a classification of the individual viewers comprising artificial intelligence viewers (e.g., an AI product seller or other character in a video game) or a human viewers (e.g., a guest part of an audience). In some embodiments, the LOD is further adjusted depending on a sub-classification of artificial intelligence viewer or of human viewer.

In some embodiments, the event management system further manages event sharing through user instances configured to process event access per guest. The instantiation process refers to the virtualization of the cloud server's properties (e.g., memory, computing power, network, operating system, etc.), in order to create an instance of the one or more cloud servers that may be dedicated to at least one user device.

In some embodiments, the event management system further comprises event sharing settings to configure sharing locations, times, applications, and other options available at each sub-universe.

In some embodiments, the plurality of sub-universes further comprises streams representing a goal-specific simulation configured to obtain data from corresponding virtual objects. A plurality of streams comprising the totality of virtual objects in a pre-determined environment forms a sub-universe. For example, a football match sub-universe may represent a stadium and all of the players, live audience, lights, etc., included in the event.

In some embodiments, at least one portion of the real world hosting a real event, herein referred to as a real event venue, and optionally the guest physical location, comprise one or more connected devices including one or more RGBD cameras, depth cameras, LIDAR cameras, CCTV cameras, Internet of Things devices, or combinations thereof. In yet further embodiments, the connected devices are configured to scan and generate 3D images of the at least one portion of the real world, detect state changes in one or more objects or users, or combinations thereof. In yet further embodiments, cameras employed within the real event venue use artificial intelligence-based machine vision to identify objects or people and their positions and orientations within the real event venue.

In some embodiments, the guest physical location is one of a virtual reality-dedicated cabin, a phone booth, a meeting room, a stadium, a living room, or any room within or outside of a building. Guest movements and interactions during the remote visit are performed by physically moving within the physical room or by manipulating a controller interface on the user device.

In some embodiments, the corresponding sub-universe hosting the real or virtual event is viewed by the one or more guests in augmented or virtual reality. In yet further embodiments, in augmented reality the one or more virtual objects of the event are projected and correspondingly scaled on a surface of the at least one guest physical location (e.g., based on the position and orientation of each guest and the corresponding surface).

In some embodiments, the at least one server may store a virtual world layer that may be separated into an augmented reality layer and virtual reality layer. The separate layers may enable accessing, through the merged reality, the virtual world system in any of augmented or virtual reality, and may be activated through user devices connected the at least one cloud server whenever accessing one or the other type of reality. Each of the layers may comprise augmentations of reality and virtual replicas that may be specific to each layer. The layers may further comprise one or more applications, which may be available from one or more application libraries stored in the memory of the at least one cloud server, from external platforms, or through blockchains or distributed ledger-based distributed databases. The applications can be one or more traditional applications, distributed applications or decentralized applications.

In some embodiments, the one or more guests access the event through the virtual world system upon receiving an invitation from the event management system. In further embodiments, each guest physical location has an associated digital identifier stored in the at least one server, the digital identifier being retrieved by the one or more user devices from the at least one server in order to access the associated guest physical location through the virtual world system. In an embodiment, the digital identifier comprises one or more of a QR code, URL, IP address, MAC address, cryptographic hash, universally unique identifier, and organizationally unique identifier. In yet further embodiments, the digital identifier is retrieved by the at least one user device upon receiving the invitation sent by the event management system to access the event. In alternative embodiments, the digital identifier is openly shared as part of contact details of the event management system.

In yet further embodiments, each interaction performed by the at least one guest, comprising, for example, transactions and engagement actions, is recorded in the memory of the at least one server under a user device personal identifier. In yet further embodiments, each interaction performed by the guest is recorded in a smart contract of a distributed ledger under the user device personal identifier. In some embodiments, the recorded interaction data may be used in the future (e.g., for creating targeted ads or personalized experience for users).

In some embodiments, the event hosted by the at least one sub-universe taking place in the guest physical location is one or more of a live sports match, an e-sports event, a video game, or a performance event.

In some embodiments, a method is performed by at least one server computer comprising at least one processor and memory. The method comprises providing a virtual world system comprising a plurality of sub-universes, each sub-universe representing at least one portion of the real world or of a virtual world, wherein at least one sub-universe hosts a real or virtual event. The method continues by providing an event management system connected to the virtual world system and configured to manage event sharing rules on a per sub-universe basis. The method further comprises associating a user device and a guest physical location with the real or virtual event. The method further comprises detecting the user device accessing the guest physical location. The method further comprises sharing to the user device and guest physical location, based on the event sharing rules, the sub-universe hosting the event.

In some embodiments, the method comprises instantiating the event management system to manage event access per guest.

In some embodiments, the method further comprises configuring sharing locations, times and applications available at each sub-universe through the event management system.

In some embodiments, the method further comprises providing, through the event management system, an invitation to the user device to access the event.

In some embodiments, the method further comprises providing in the at least one server a digital identifier associated with the guest physical location. The digital identifier may be retrieved by the user device from the at least one cloud server in order to access the guest physical location through the corresponding sub-universe in the virtual world system.

In yet further embodiments, the method further comprises sending, through the event management system, the digital identifier upon the user device receiving the invitation to access the event, or openly sharing the digital identifier as part of contact details of the guest physical location or of the corresponding sub-universe.

In some embodiments, the method further comprises storing in the at least one server a user device personal identifier enabling identification of the guest in order to provide a personalized experience to the guest; and recording each transaction performed by the guest under the user device personal identifier.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below, and particularly pointed out in the claims filed with the application. Such combinations have advantages not specifically recited in the above summary Other features and advantages of the present disclosure will be apparent from the accompanying drawings and from the detailed description that follows below.

BRIEF DESCRIPTION OF THE DRAWINGS

Specific features, aspects and advantages of the present disclosure will be better understood with regard to the following description and accompanying drawings, where.

DETAILED DESCRIPTION

In the following description, reference is made to drawings which show by way of illustration various embodiments. Also, various embodiments will be described below by referring to several examples. It is to be understood that the embodiments may include changes in design and structure without departing from the scope of the claimed subject matter.

In the current disclosure, an accurate and flexible merged reality system and method configured to enable remotely viewing and participating in real or virtual events is provided. In the merged reality system, at least one portion of the real or a virtual world may be respectively replicated or streamed into corresponding sub-universes that make part of a virtual world system, wherein some of the sub-universes comprise entertainment events that guests may view and interact with from one or more associated guest physical locations. A network of sub-universes may form a universe of a virtual world system. Other virtual elements, such as purely virtual objects or graphical representations of applications and games, can also be configured in the virtual world system.

Figure 1A:
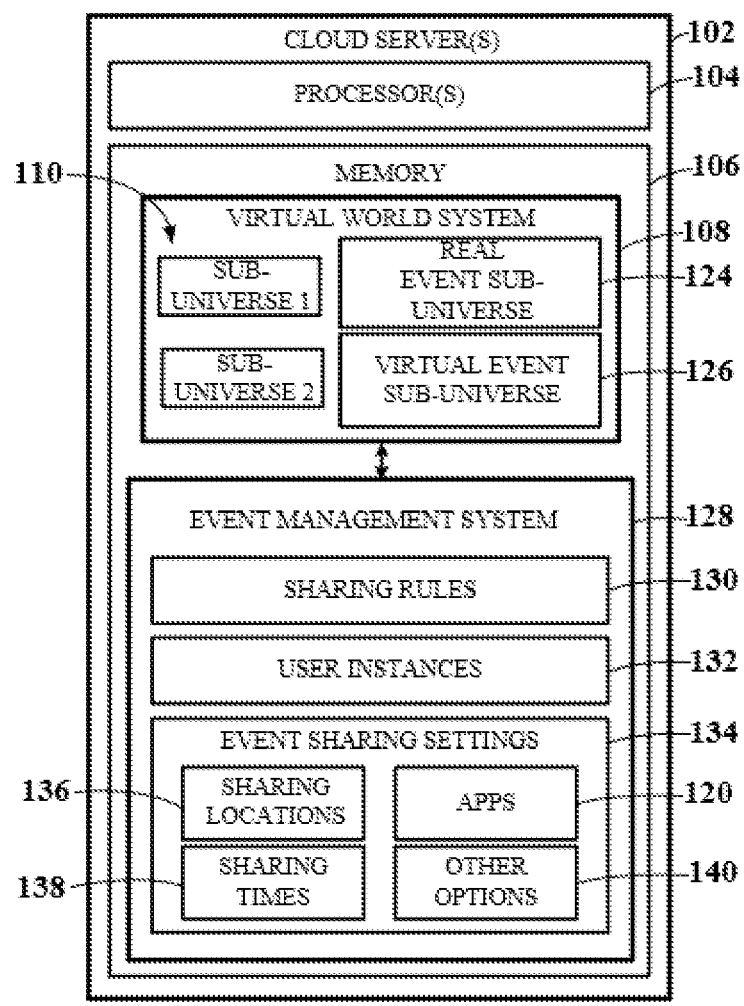
FIG. 1A-1B depict schematic diagrams of a cloud server of a server computer system that may be used to implement a merged reality system, according to an embodiment.

FIG. 1A depicts a schematic diagram of a cloud server 102 of a server computer system that may be used to implement a merged reality system 100, according to an embodiment.

Figure 1B:
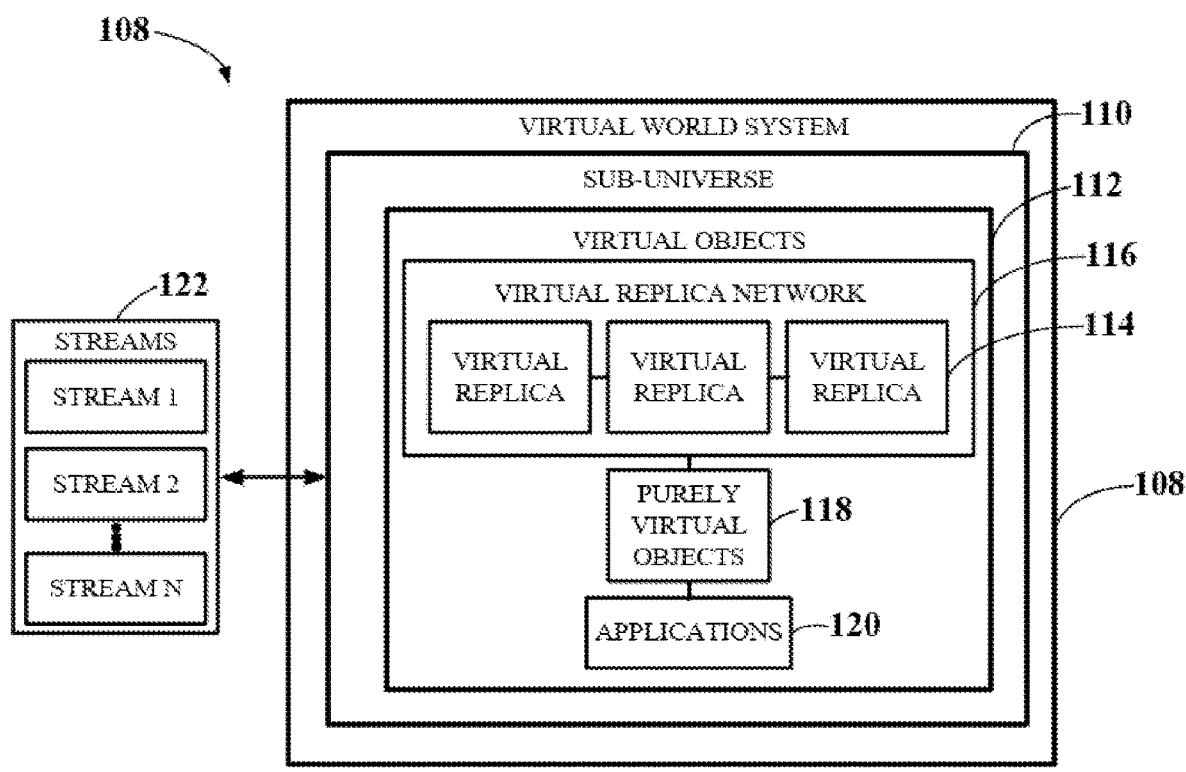

The cloud server 102 comprises one or more processors 104 and memory 106 storing data and instructions necessary to operate a virtual world system 108 comprising a plurality of sub-universes 110, each sub-universe 110 representing at least one portion of the real world or of a virtual world. With reference to FIG. 1B, each sub-universe 110 includes a plurality of virtual objects 112 comprising connected virtual replicas 114 forming a virtual replica network 116, which enable the establishment of peer-to-peer (P2P) connections either through direct physical communications or through indirect virtual replica-based connections. The virtual objects 112 may further comprise purely virtual objects 118 not available in the real world and applications 120 that can be located in various parts of the world and which may comprise a corresponding graphical representation. A plurality of sub-universes 110 comprising virtual replica networks 116 in inter-connected areas of the world along with the purely virtual objects 118 and applications 120 form the virtual world system 108, which may be accessed through suitable interfaces of user devices. Each sub-universe 110 may further comprise a plurality of streams 122 (e.g., streams 1-N), each stream 122 comprising virtual objects 112, wherein each stream 122 is configured to obtain data from the corresponding virtual objects 112 and to perform goal-specific simulations.

Referring again to FIG. 1A, at least one sub-universe 110 hosts and is associated to a real event 124 or a virtual event 126. For example, a real sub-universe 124 may comprise virtual objects 112 representing real objects in a real location hosting a live entertainment event, such as a sports match or a live performance event. A virtual event sub-universe 126 may comprise, for example, virtual objects 112 representing an e-sports event or a video game. The real-event sub-universe 124 and the virtual event sub-universe 126 may exist in the virtual world system 110 along with other sub-universes (labeled "1" and "2" in FIG. 1A).

The memory 106 may further store an event management system 128 connecting to the virtual world system 108 and being configured to manage event sharing rules 130 per sub-universe 110. The cloud server 102 connects, through a network, to at least one guest physical location from where one or more guests view the real or virtual event by accessing the corresponding sub-universe 110 through the virtual world system 108 via a user device. The event management system 128 associates one or more user devices and guest physical locations to the at least one real or virtual event. The event management system 128 further detects, through the network, one or more user devices of one or more guests accessing at least one guest physical location where a real event is associated, triggering the event management system 128 to share with the associated one or more user devices and guest physical locations, based on the event sharing rules 130, the sub-universe 110 corresponding to the real or virtual event.

In some embodiments, the event management system 128 manages event sharing through user instances 132 configured to process event access per guest through an instantiation process. The instantiation process refers to the virtualization of the cloud server's properties (e.g., memory, computing power, network, operating system, etc.), in order to create an instance of the one or more cloud servers 102 that may be dedicated to at least one user device.

In yet further embodiments, the event management system 128 further comprises event sharing settings 134 to configure sharing locations 136, sharing times 138, applications 120 available at each sub-universe 110, and other options 140. The event sharing locations 136 may comprise 3D coordinates of specific places that an event administrator may enable for sharing the one or more real or virtual events through the corresponding sub-universes 110. In some situations, some events and their corresponding sub-universes 110 may be available only at specific times, which may be configured through the sharing times setting 138. An event administrator may additionally configure one or more applications 120 in the one or more sub-universes 110 which may prompt user interaction to increase the entertainment factor of the selected real or virtual event. The other options 140 may enable configuring other types of settings where events may be available, such as specific weather conditions, predetermined task-accomplishment requirements, membership entitlements, and the like. The applications 120 may be furthermore configured to be available only at specific locations, times or under other conditions determined through the other options 140

The virtual world system 108 of the current disclosure may refer to an ad-hoc (e.g., created or activated on demand) or a persistent virtual world system 108. In the current disclosure, the term "persistent" is used to characterize a state of a system that can continue to exist without a continuously executing process or network connection. For example, the term "persistent" may be used to characterize the virtual world system where the virtual world system and all of the virtual replicas, purely virtual objects and applications therein comprised continue to exist after the processes used for creating the virtual replicas, purely virtual objects and applications cease, and independent of users being connected to the virtual world system. Thus, the virtual world system is saved in a non-volatile storage location (e.g., in the cloud server 102). In this way, virtual replicas 114, purely virtual objects 118 and applications 120 may interact and collaborate with each other when being configured for accomplishing specific goals even if users are not connected to the server.

In the current disclosure, the term "virtual replica" refers to accurate and persistent virtual representations of real-world elements. In an embodiment, the virtual replicas 114 of the current disclosure refer to a virtual version, also herein referred to as virtual twin, of a real-world element, also herein referred to as real twin, which may either be mapped or modeled through computer assisted drawing (CAD) or computer-assisted engineering (CAE) methods, input by computer models of the real objects (e.g., building information models—BIMs) or other suitable methods, and which may mirror not just the appearance but also the behavior of the real twin. The real-world objects may additionally include sensors that can provide the virtual replicas 114 with multi-source input data for enriching and synchronizing the virtual replicas 114 with their respective real counterpart. Thus, virtual replicas 114 may obtain data from one or more sources (e.g., from one or more real-world objects, environmental sensors, computing devices, etc.). As used herein, the term "multi-source" refers to data that may be obtained from multiple sources.

Virtual replicas may be updated based on multi-source data, such as by updating known parameters or features, by enriching the virtual replicas with additional parameters or features, or the like. In the current disclosure, the term "enriching" is used to describe the act of providing further properties to a virtual replica based on the multi-source data. Enriching a virtual replica may be considered a special form of updating the virtual replica with one or more new forms of data that may not have been previously present in the virtual replica. For example, enriching the virtual replicas may refer to providing real-world data captured from sensing mechanisms on a plurality of devices, wherein the further real-world data comprises video data, temperature data, real-time energy consumption data, real-time water consumption data, speed or acceleration data, or the like.

The virtual replica networks 116 of the merged reality system enables machine to machine, human to machine, machine to human, and human to human communication and interactions. The interaction mechanics are defined through the use of computer code included in computer scripts and computer programs, and may be enabled through applications, smart contracts available in a blockchain or distributed ledger-based distributed database, or combinations thereof provisioned in the virtual world system where the interactions and interaction applications take place. The applications, smart contracts or combinations thereof thus enable digitally codifying and representing the possible and desired interactions and interaction interfaces between all or most elements of the real world in a predetermined area through the virtual world system. Interactions may be experienced by users in the form of interactive game-like applications or through game-like interaction mechanics.

Figure 2:
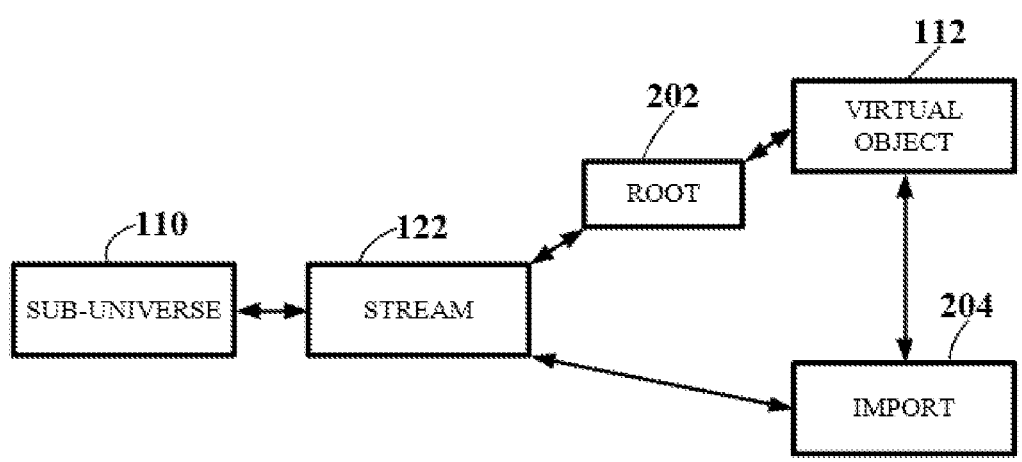
FIG. 2 shows a sub-universe and streams that may be part of a virtual world system stored in the at least one cloud server, according to an embodiment.

FIG. 2 depicts a schematic diagram of a system 200 illustrating the relationships between a sub-universe 110 and some of its constituent elements. A sub-universe comprises a plurality of streams 122, wherein each stream 122 may connect to a root node 202 or root simulation object that spawns a plurality of stream-related virtual objects 112. The stream 122 may additionally connect to an import function 204 that defines the virtual objects 112 that the stream 122 needs to perform the required simulations. In other words, the stream 122 includes any part of the virtual replica network that may be related to the specific function of the stream 122. The import function 204 may define which virtual objects 112 to consider for the traffic simulation. The stream 122 may then read the behavior of each of the virtual objects 112 by using a combination of virtual and real sensors and perform goal-specific simulations of traffic scenarios. A plurality of streams 122 comprising the totality of virtual objects 112 in a pre-determined environment forms a sub-universe 110. For example, a football match sub-universe may represent a stadium and all of the players, live audience, lights, etc., included in the event.

Figure 3:
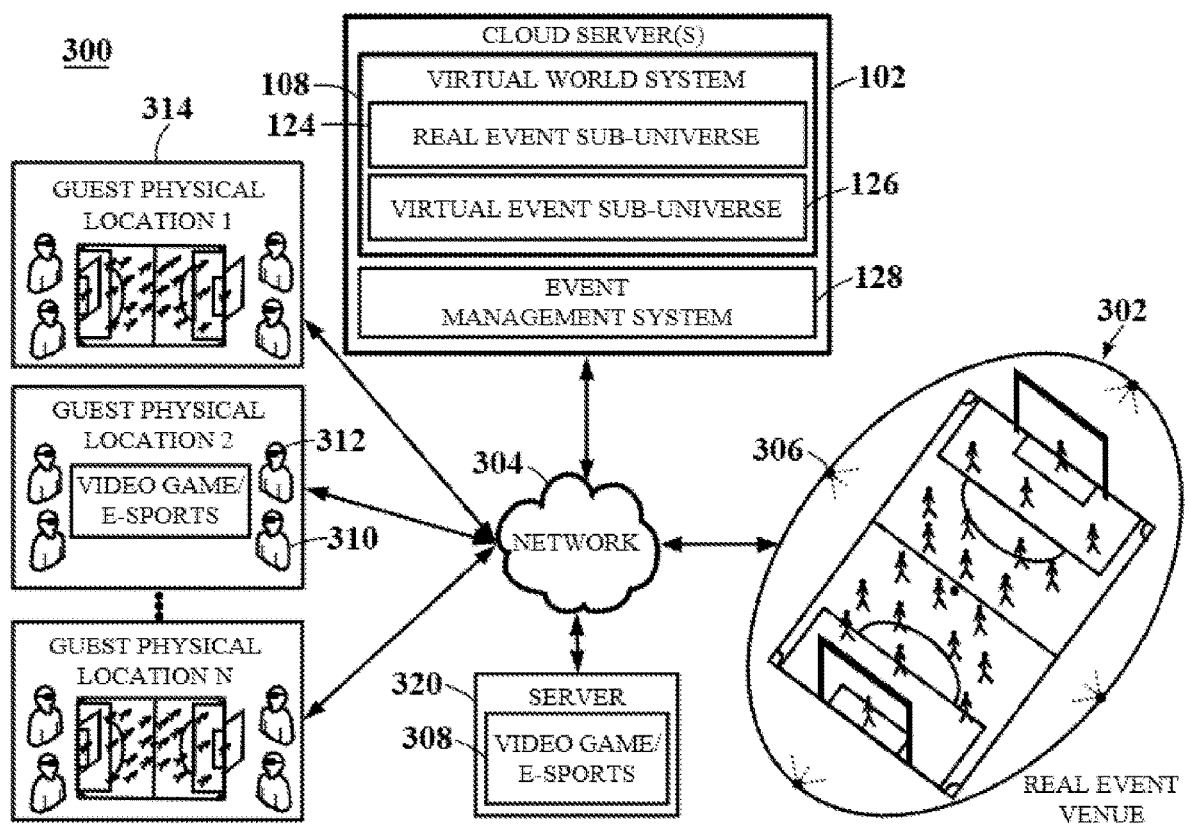
FIG. 3 shows a schematic diagram of an event being shared to a plurality of guests in at least one guest physical location through the virtual world system, according to an embodiment.

FIG. 3 shows an embodiment of a merged reality system 300. Some elements of FIG. 3 may refer to similar or the same elements of the system depicted in FIGS. 1A-2 and thus may use the same reference numbers.

A virtual world system 108 stored in memory of at least one cloud server 102 comprises a real event sub-universe 124, a virtual event sub-universe 126, and an event management system 128. The cloud server 102 receives media streams and data from a real event venue 302 connected through a network 304, which are replicated virtually in the real event sub-universe 124. The real event venue 302 comprises a plurality of connected devices 306 which connect through the network 304 to the virtual world system 108 and which include sensing mechanisms configured to capture real-world data of the real event venue 302. The cloud server 102 further receives media streams from a virtual event, such as from one or more video games or e-sports 308, which may be hosted on one or more external servers 320. Alternatively, the one or more video games or e-sports 308 may also be hosted on the one or more cloud servers 102. The one or more video games or e-sports 308 are streamed to the virtual event sub-universe 126.

Guests 310 may remotely view and interact with the real event hosted at the real event venue 302 or with the virtual event hosted on the one or more external servers 320 by correspondingly accessing the real event sub-universe 124 or virtual event sub-universe 126 through the virtual world system 102 via a user device 312. The user device 312 may be one of a mobile device, personal computer, game console, media center, smart contact lenses, and head-mounted display, amongst others. Each guest may be located at one of a plurality of guest physical locations 314.

In some embodiments, each of the user devices 312 and guest physical locations 314 may be associated to one or more sub-universes, such as the real event sub-universe 124 or virtual event sub-universe 126. Said association with guest physical locations 314 may be configured through the event management system 128 by accessing and adjusting, for example, the sharing location settings 136 of the event sharing settings 134 depicted in FIG. 1A, such that the events are only viewable remotely from specific guest physical locations 314. The event management system 128 may further enable configuring availability of the events at specific times through, e.g., the sharing times setting 138 of the event sharing settings 134 of FIG. 1A. However, under certain conditions that may be configured through, for example, the other options 140 setting of the event sharing settings 134 (e.g., membership fee payments), the events may also be configured to be viewable remotely from guest physical locations 314 on demand or under other circumstances, such as specific weather conditions or after having performed one or more tasks. These arrangements may be defined through other options 140 and/or configured into specific applications 120 that may be also configured through the event sharing settings 134, as illustrated in FIG. 1A.

For example, a guest 310 interested in viewing and/or interacting with one or more of the events may access the virtual world system 108, select a desired event from one of the available sub-universes, and select a desired guest physical location 314 where the event may be available, wherein the guest physical location 314 may be a predetermined location configured through the event management system 128 or a new one added by the guest 310. The guest physical location 314 may be one or more of a virtual reality-dedicated cabin, a phone booth, a meeting room, a stadium, a living room, within or outside of a building where a guest 310 can connect to the real or virtual event via the corresponding sub-universe. In some embodiments, the guest physical location 314 comprises connected devices, such as cameras recording and detecting movements and expressions from a guest that are simulated on the guest's avatar. In these embodiments, guest movements and interactions with objects or people in the events are performed by physically moving within the guest physical location 314 or by manipulating a controller interface on the user device 312 (e.g., controller pad, buttons, joystick, air movements on an air interface, etc.).

In some embodiments, the plurality of connected devices 306 in the real event venue 302 and/or in the guest physical location 314 comprise one or more RGBD cameras, depth cameras, LIDAR cameras, CCTV cameras, or Internet of Things devices. In a yet further embodiment, the connected devices 306 are configured to record events in the real event venue 302 or in the at least one guest physical location 314, scan and generate 3D images, detect state changes in one or more objects, or combinations thereof.

In some embodiments, the guest physical location 314 has an associated digital identifier stored in the at least one cloud server 102, the digital identifier being retrieved by the user device 312 in order to access event through the virtual world system 108. In some embodiments, the digital identifier comprises one or more of a QR code, URL, IP address, MAC address, cryptographic hash, universally unique identifier, and organizationally unique identifier. In yet further embodiments, the guest 310 accesses the event through the virtual world system 108 upon receiving an invitation through the event management system 128. In yet further embodiments, the digital identifier is retrieved by the user device 312 upon receiving the invitation. In other embodiments, the digital identifier is openly shared, respectively, as part of contact details of the real or virtual event sub-universe 124-126.

Interactions in the guest physical location 314 are provisioned through computer code included in computer scripts and computer programs, and are enabled through applications comprising traditional, distributed or decentralized applications; smart contracts; and the like, or combinations thereof. The applications, smart contracts or combinations thereof thus enable digitally codifying a variety of virtual interactions, such as virtual buying, virtual investments, virtual auctions, virtually playing, virtually testing, virtually inspecting, virtually touching, virtually gazing, virtually physically speaking, virtually listening, virtually physically interacting, virtually voting, virtually signing, virtually drawing, virtually composing, virtually creating, virtually collaborating, virtual locomotion, virtually driving, virtually flying, virtually performing surgery, virtually consulting, virtually vacating, virtually constructing, virtually engineering, virtually designing, virtually training, virtually learning, virtually educating, virtually medicating, virtually remote controlling, virtually feeling, virtually emoting, virtually winking, virtually waving, virtually paying, virtually transferring, virtually sharing, and virtually collecting, amongst others.

In some embodiments, data of objects within the real event venue 302 and people therein included comprise real spatial data that is directly input, or captured and transmitted to the real event sub-universe 302 and is converted into virtual data comprising virtual spatial data. Combinations of the real and virtual spatial data by the at least one cloud server 102 enable augmenting the real spatial data of the real event venue 302 with the virtual spatial data. Thus, the position and orientation of the objects and people within the event are mapped or sensed through the plurality of connected devices 306 and are updated in real-time in the virtual world system 108, enabling the at least one guest 310 to view in real-time any change in the real event venue 302.

In some embodiments, the real or virtual event sub-universes 124-126 are accessed by the at least one guest 310 through the virtual world system 108 in augmented or virtual reality. In these embodiments, the at least one cloud server 102 stores separate layers for each of the augmented and virtual reality that are activated through the user device 312 connected to the at least one cloud server 102, each layer comprising augmentations of reality and virtual replicas specific to each layer. For example, the people within the real entrainment event venue 302 may have specific objects activated in the augmented reality layer that may only be viewed in augmented reality. When the at least one guest 310 visits the event, he or she may only view each of the participants and objects of the event, with no further augmentation, but when the at least one guest 310 activates the augmented reality layer, objects and interactions with the augmentations in the augmented reality layer may be available to the at least one guest 310.

According to an embodiment, user devices 312 have a personal identifier or respective user data that enables the at least one cloud server 102 to identify participants in order to provide a personalized experience. Further in this embodiment, each transaction performed by the at least one guest 310 is recorded in the memory of the at least one cloud server 102 under the user device personal identifier. In yet further embodiments, each interaction, comprising transactions within the events, is recorded through one or more respective smart contracts on a blockchain or distributed ledger under the user personal identifier. In yet further embodiments, interactions between virtual objects of the real or virtual event sub-universes 124-126 are recorded through smart contracts on a blockchain or distributed ledger.

In some embodiments, the systems of the current disclosure may use a cloud to edge infrastructure that may implement distributed computing capabilities employing public or private cloud servers, fog servers, and other systems such as enterprise systems, mobile platforms, machinery, robots, vehicles, sensors or user devices, all of which may connect through a network 304. In some embodiments, the cloud to edge infrastructure further comprises a distributed ledger-based infrastructure facilitating the transfer and storage of data necessary to widely distribute the virtual world system 108, including virtual replicas, pure virtual objects, applications, and any event or interaction within the virtual world system 108. This way, resources including physical servers and network equipment enable a shared storage and computing that may be dynamically allocated depending on factors such as the distance of the user to the resources and the network and computational demand from the users relative to each other and to the locational positions where they are, commanding more or less compute accordingly. In some embodiments, the dynamic allocation of storage and computing is codified into smart contracts using the distributed ledger infrastructure, automatizing the transactional logic (e.g., the computer logic behind each allocation of storage and computing) and the consequences or results of allocation.

According to an embodiment, tracking of devices is performed by one or more of time of arrival (TOA), angle of arrival (AOA), and visual imaging techniques. The tracking may be performed by one or more of radar technology, antennas, Wi-Fi, inertia measuring units, gyroscopes, and accelerometers.

In some embodiments, in order to reduce hardware and network demands, contribute to the reduction of network latency, and improve the general merged reality experience, the system may connect through a network 304 including millimeter-wave (mmW) or combinations of mmW and sub 6 GHz communication systems, such as through $5^{th}$ generation wireless systems communication (5G). In other embodiments, the system may connect through wireless local area networking (Wi-Fi) providing data at 60 GHz. Provided communication systems may allow for low latency and high Gbps downlink speeds to end points in the field, complying with parameters necessary for executing the typically highly-interactive digital reality applications or other highly-demanding applications. This results in high-quality, low latency, real-time digital application content streaming In other embodiments, the system may communicatively connect through 4th generation wireless systems communication (4G), may be supported by 4G communication systems, or may include other wired or wireless communication systems.

In other embodiments, global navigation satellite systems (GNSS), which refers collectively to multiple satellite-based navigation systems like GPS, BDS, Glonass, QZSS, Galileo, and IRNSS, may be used for enabling positioning of devices. Employing signals from a sufficient number of satellites and techniques such as triangulation and trilateration, GNSS can calculate the position, velocity, altitude, and time of devices. In an embodiment, the external positioning system is augmented by assisted GNSS (AGNSS) through the architecture of existing cellular communications network, wherein the existing architecture comprises 5G. In other embodiments, the AGNSS tracking system is further supported by a 4G cellular communications network. In indoor embodiments, the GNSS is further augmented via radio wireless local area networks such as Wi-Fi, preferably, but not limited to, providing data at 60 GHz. In alternative embodiments, the GNSS is augmented via other techniques known in the art, such as via differential GPS (DGPS), satellite-based augmentation systems (SBASs), real-time kinematic (RTK) systems. In some embodiments, tracking of devices is implemented by a combination of AGNSS and inertial sensors in the devices.

Figure 4:
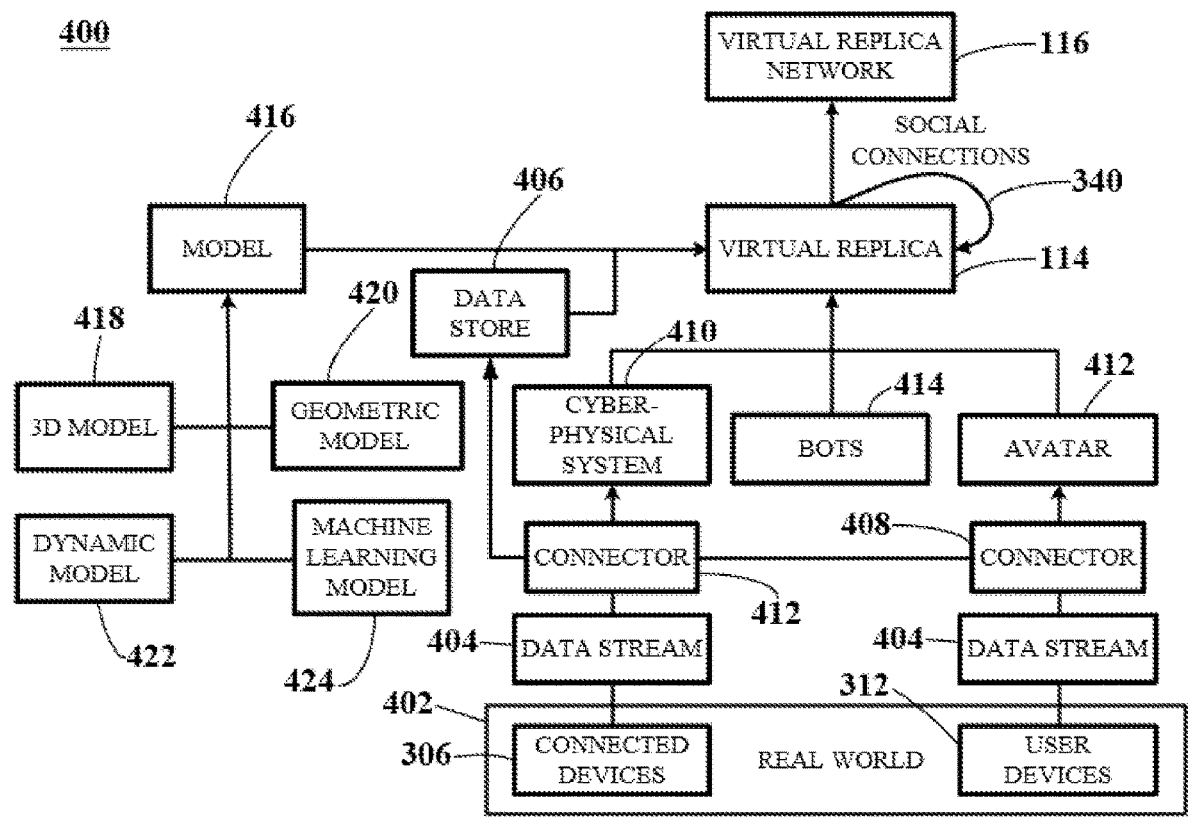
FIG. 4 depicts a schematic diagram illustrating data and models used to generate a virtual replica network used in a merged reality system, according to an embodiment.

FIG. 4 depicts a diagram of a system 400 describing the design of a virtual replica and the derived virtual replica network used in a merged reality system, according to an embodiment. Some elements of FIG. 4 may refer to similar or the same elements of FIGS. 1A-3 and thus may use the same reference numbers.

As viewed in FIG. 4, elements in the real world 402, comprising connected devices 306 and users devices 312, are connected to the virtual world system through data streams 404. These data streams 404 can be uni-directional or bi-directional depending on the capabilities of the connected devices 306. The virtual world system, as explained with reference to FIG. 1, may be stored in cloud servers 102 and shared in a cloud to edge computing and networking infrastructure.

The data streams 404 sent by connected devices 306 may be obtained by sensors installed on the connected devices 306, such as one or more temperature sensors, proximity sensors, inertial sensors (e.g., inertia measuring units, accelerometers, gyroscopes, and magnetometers), infrared sensors, pollution sensors (e.g., gas sensors), pressure sensors, light sensors, ultrasonic sensors, smoke sensors, touch sensors, chromatic sensors, humidity sensors, water sensors, electrical sensors, or combinations thereof. The data streams 404 of the user devices 312 may comprise, apart from sensor data, user input data resulting from interactions with applications via the user devices 312.

By providing a plurality of connected devices 306 and user devices 312 with sensing mechanisms constantly capturing data from the real world 402, the virtual world and each of the synchronized virtual replicas 114 are kept updated with real-time, multi-source data that mirror the conditions of the real world 402. The multi-source data includes capturable data of each real-world element, comprising one or more of 3D image data, 3D geometries, 3D entities, 3D sensory data, 3D dynamic objects, video data, audio data, priority data, chemical composition, waste production data, textual data, time data, positional data, orientational data, velocity data, temperature data, humidity data, pollution data, lighting data, volume data, flow data, chromatic data, power consumption data, bandwidth data, and mass data, amongst others.

Interactions in the virtual world system with the virtual replicas 114 are enabled through the exchange of data, using publish/subscribe services connected to data stores 406 of each virtual replica 114. Data types may include periodic and aperiodic, synchronous and asynchronous data. Each virtual replica 114 keeps a data store 406 where the data can be updated by the real twin or by microservices (not shown). Data in the virtual world system can be associated directly to specific virtual replicas 114 or can be processed as anonymous data, which can comprise aggregation of multiple streaming sources of related virtual replicas 114. For example, data from all the units of a specific model of a car could be processed and aggregated to stream data to be available for predictive maintenance services.

Microservices refer to individual services that can be developed, deployed and maintained independently, each service being configured to perform discrete tasks and communicating with other services through APIs. Each microservice can update data in the data store 406 of the virtual replicas 114 using the virtual replica models and relationships with the environment to modify the value of specific attributes of the virtual replicas 114. Microservices can use specific core services of the virtual world system, such as a plurality of engines, or be connected to external platforms, as will be apparent in FIG. 5.

The data streams 404 may be stored in the data stores 406 via connectors 408. The connectors 408 may comprise software and hardware used to read data of the data streams 404 and write to the data stores 406. The connectors 408 may use publish/subscribe application programming interfaces (APIs) to connect to the data stores 406 and help to feed the virtual replicas 114 with the data streams 404 from connected devices 306 and user devices 312. The data streams 404 of the connected devices 306 further feed a cyber-physical system 410 through the connectors 408, whereas the data streams 404 of user devices 404 feed virtual avatars 412 of the users through the connectors 408. System 400 also comprises implementation of bots 414, which may be include hardware and software configured to respond as automated agents with human or human-like behavior by employing machine learning algorithms The human avatars 412 may be configured to display the physical characteristics of the human users, or may be configured with a different visual aspect and characteristics.

In the current disclosure, a pair of virtual-real twin, or twin-pair, can be considered as a cyber-physical system 410, which is an integration of computation with physical processes whose behavior is defined by both cyber and physical parts of the system. Therefore, a virtual replica 114 is the cyber part of the cyber-physical system 410. The virtual replica 114 may then be considered as an extension of the real twin that allows connecting the physical part with artificial intelligence and simulations to improve the capabilities and performance of the object. The virtual replica 114 may, in some embodiments, be a substitute of a part of the physical components and processes. For example, in cases when a sensor is failing in the real counterpart the sensing inputs for the real twin are provided by the interactions of the virtual twin in the virtual world. In another example, part of the computation for the real twin could be done in the virtual world if the battery is running low in the real twin.

The virtual replicas 114 may also comprise models 416, which refer to any graphical, mathematical or logical representation of aspects of the reality that may be used to replicate the reality in the virtual world system. In some embodiments, suitable models 416 comprise one or more of a 3D model 418, geometric model 420, dynamic model 422, and machine learning model 424. Although only four models are herein disclosed, those skilled in the art may appreciate that the system may be adapted to implement fewer or more models than those presented, as required.

The 3D model 418 goes in hand with the geometric model 420 to show data included in each of the geometries of the virtual replica 114, such as textures, colors, shading, reflection, collision effects, and the like. The 3D models 418 comprise the 3D data structure that is used to visually represent the virtual replicas 114 and other virtual elements in the virtual world system, such as applications, ads, virtual bots, etc. In one embodiment, the 3D data structure is an octree data structure, such as sparse voxel octrees or dense voxel octrees. In other embodiments, other suitable data structures can be used, such as quadtrees, BSP trees, 3D arrays, kD trees, point clouds, wire-frames, boundary representations (B-Rep), constructive solid geometry trees (CSG Trees), bintrees, and hexagonal structures. The 3D data structure serves the function of accurately and efficiently representing the data of each of the geometries of the virtual objects in the virtual world system. A correct selection of the 3D data structure depends on the origin of the data, the precision of geometries sought for during rendering; whether the rendering is done in real-time or is pre-rendered; whether the rendering is performed via the cloud servers, via the user devices, fog devices, or combinations thereof; the specific applications for which the virtual world system is employed, for example, a higher level of definition may be required for a virtual visitation requiring checking specific textures and details of a product; memory capacities from the servers and from the user devices and thus, desired memory consumption; and others.

The geometric model 420 comprises the mathematical model defining the shape of the virtual replica 114 based on the real-world element and may be complemented by the 3D model 418.

The dynamic model 422 represents the mathematical model describing the behavior of the real-world objects in the virtual world over time, may comprise a set of states that occur in a defined sequence, and may comprise continuous (e.g., algebraic or differential equations) and discrete (e.g., as state-machine or stochastic models) dynamics models.

The machine learning model 424 is a mathematical representation of the real-world objects and processes, normally generated by a machine learning algorithm based on actual or simulated data that have been used as training data to learn from. This model may enable implementation of artificial intelligence techniques that can be used to optimize the operation and/or performance of the real twin through the virtual twin. The machine learning model may employ machine learning algorithms that allow teaching a virtual replica 114 about the behavior of a real twin in order to simulate the behavior of the real twin.

In some embodiments, the models 416 used by the virtual replicas 114 consider the level of detail (LOD) required by a specific scenario computation. LOD involves decreasing the complexity of a model representation as the virtual replica 114 moves away from the viewer, or according to other metrics such as object importance, viewpoint-relative speed, viewer classification, or position. LOD is a feature typically used in game engines to optimize real-time rendering, using more detailed models only where the point of view of the user is closer to the object. LOD management increases the efficiency of computing processes, such as the rendering process by decreasing the workload on graphics pipeline usage, typically vertex transformations, or by enhancing physical simulation, as different 3D models 418 or dynamic models 422 can be associated to the virtual replicas 114, from low to high fidelity models, so that different simulations can be done depending on the situation. In general, LOD management may improve framerates and reduce memory and computing demand LOD management allows also to provide an optimized user experience, depending on the specific requirements and context. In some embodiments, LOD is further adjusted to individual viewers, wherein the adjustments comprise considering the LOD of rendering of a specific scene based on whether the viewer is an artificial intelligence viewer (e.g., an AI host or sales assistant) or a human viewer (e.g., a buyer or event participant).

A plurality of connected virtual replicas 114 forms a virtual replica network 108. Each virtual replica 114 in the virtual replica network 108 may display social connections 340 with each other, i.e., interactions amongst each other. These social connections 340 may be managed, in some embodiments, through social media networks.

In some embodiments, a virtual replica 114 includes one or more of 3D world and building data, such as SLAM or derivate-mapping based data; 3D geometry data; 3D point cloud data; or geographic information system data representing real-world structural properties that may serve to model a 3D structure for digital reality applications.

In some embodiments, each of the virtual replicas 114 may be geolocated using a reference coordinate system suitable for use with current geolocation technologies. For example, the virtual replicas may use a World Geodetic System standard such as WGS84, which is the current reference coordinate system used by GPS.

Figure 5:
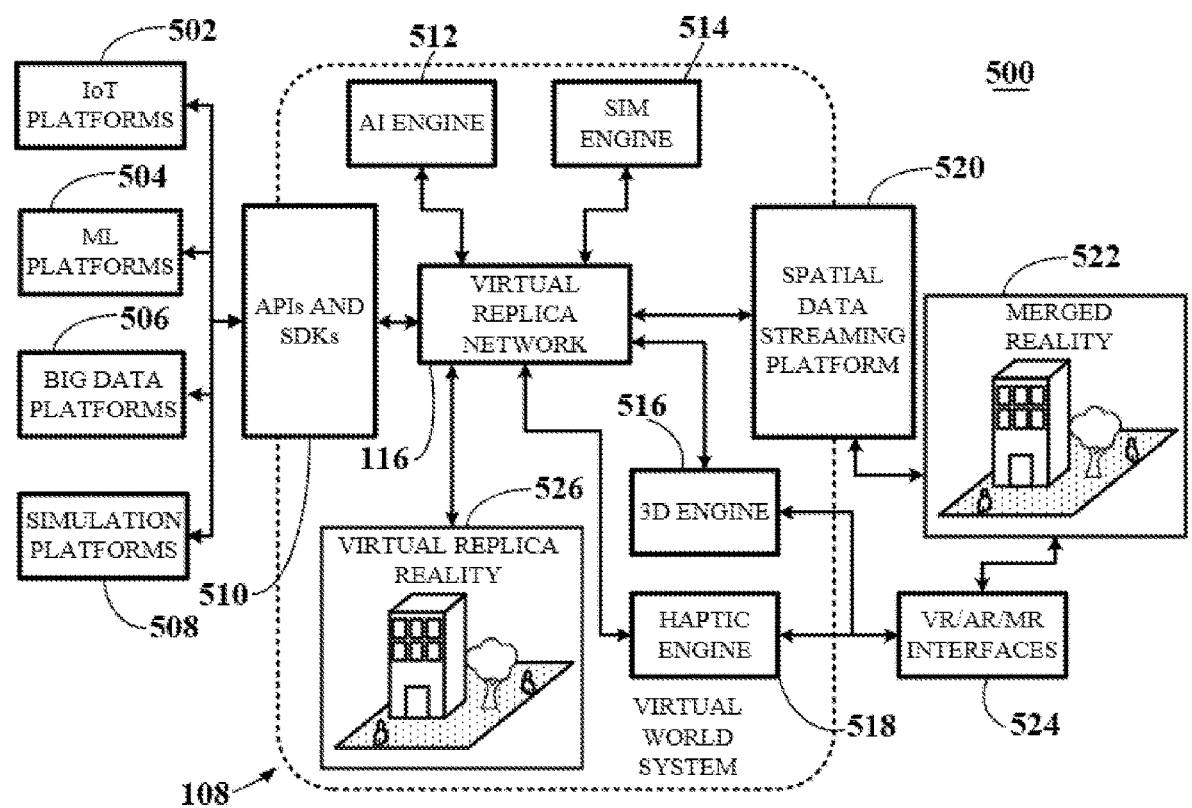
FIG. 5 depicts a schematic diagram illustrating platforms and interfaces used to generate virtual replica networks used in a merged reality system, according to an embodiment.

FIG. 5 depicts a diagram of a system 500 describing platforms and interfaces used to generate virtual replica networks used in a merged reality system, according to an embodiment. Some elements of FIG. 5 may refer to similar or the same elements of FIGS. 1A-4 and thus may use the same reference numbers.

The elements located within the dotted lines represent the virtual world system 108 where virtual replicas and virtual replica networks 116 reside.

As viewed in FIG. 5, the virtual replica networks 116 can connect to a plurality of external platforms or to engine services included in the virtual world system 108. The plurality of external platforms may include, for example, one or more Internet of Things (IoT) platforms 502, machine learning (ML) platforms 504, big data platforms 506, and simulation platforms 508, which may connect to the virtual world system 108 through application programming interfaces (APIs) and software development kits (SDKs) 510, in order to provide and manipulate models and consume or publish data to the virtual replicas.

The IoT platforms 502 refer to software and/or hardware that enable the management of multi-source input data received from sensors in connected devices and user devices. The ML platforms 504 refer to software and/or hardware that provide the virtual replicas with the capability to use machine learning models and algorithms for artificial intelligence applications. The big data platforms 506 refer to software and/or hardware that enable organization in developing, deploying, operating and managing big data related to the virtual replica network 116. The simulation platforms 508 refer to software and/or hardware that enable using the virtual replicas and their data and models in order to virtually recreate the real behavior of the real-world entities.

The engine services included in the virtual world system 108 may include an artificial intelligence engine 512, a simulation engine 514, a 3D engine 516, and a haptic engine 518, amongst others. The artificial intelligence engine 512 may include software and/or hardware that enables the management and application of machine learning models and algorithms for artificial intelligence applications. The simulation engine 514 may include software and/or hardware that enable using virtual replicas and their data and models in order to virtually recreate the real behavior of the real-world entities. The 3D engine 516 may include software and/or hardware that may be used in the creation and processing of 3D graphics of the virtual replicas. The haptic engine 518 may include software and/or hardware that enables implementing haptic features to applications and virtual replicas to provide a touch based interaction to the users. The virtual world system also connects to a spatial data streaming platform 520 configured for the optimized exchange and management of real and virtual spatial data in the virtual world system and between the virtual world systems and the merged reality 522.

The 3D engine 516 and haptic engine 518 may connect to the merged reality 522 via suitable digital reality interfaces 524 in user devices, enabling access to the merged reality 522 in any of virtual reality or augmented reality. The merged reality 522 provides users with an extended reality where real elements are overlapped or augmented by virtual objects, anchored in specific geo-locations or to real elements in the reality, and comprising AI and simulations connected to the virtual replicas of the reality. Users can interact without limitations with this merged reality 522 through their avatar.

The virtual replica network 116 is an integral part of the virtual world system 108 and enables an implementation of a virtual replica reality 526, where all or most real-world elements are completely virtual and may be virtually enhanced (e.g., adding features to the virtual replicas that the real-world elements may not have). In the current disclosure, the virtual replica reality 526 differs from the typical concept of virtual reality, in that virtual reality may represent an immersive realization of the world where all or most elements are virtual, while the virtual replica reality 526 takes into account the context, accurate geolocation based on the real world objects, and interactions and connections between the virtual replicas, which are kept continuously updated through the data and models input and manipulated via the plurality of platforms and/or engines. Thus, in an embodiment, the virtual replica reality 526 refers to the actual virtual replica of the world within the virtual world system, wherein the virtual world system provides the data, models, interactions, connections and infrastructure of each virtual replica that, in some embodiments, provide the virtual replica with self-computing capabilities and autonomous behavior.

In yet further embodiments, the system 500 may store in the memory of at least one server separate layers for augmented reality and virtual reality. The separate layers may enable accessing, through the merged reality 522, the virtual replica reality 526 in any of augmented or virtual reality, and may be activated through user devices connected the at least one server whenever accessing one or the other type of reality. Each of the layers may comprise augmentations of reality and virtual replicas that may be specific to each layer. For example, when accessing the merged reality 522 in augmented reality, a user may view the real objects located in the current merged reality scene, the current augmentations of each real object via the corresponding virtual replicas, and the purely virtual objects configured to be visible only in augmented reality. In another example, when viewing the merged reality 522 in virtual reality, the user may only view a version of the virtual replica reality 526 configured for virtual reality, comprising augmentations configured only for the virtual reality view. However, when in virtual reality, users may activate the augmented reality layer in order to view the augmentations and virtual objects originally destined for augmented reality. Likewise, when in augmented reality, users may activate the virtual reality layer in order to be fully transported to virtual reality while still being able to view the augmentations in augmented reality. The data and models input through the various platforms and/or engines of the virtual world system provide self-computing capabilities and autonomous behavior of virtual replicas, synchronized behavior between the virtual replicas and counterpart real-world objects, enhanced capabilities of the real-world objects through the virtual replicas, and enables employing the data obtained from the real-world objects to perform simulations and machine learning training and inference in order to perform system optimizations (e.g., building energy consumption optimizations).

"Self-computing capabilities", also referred to as "self-managing capabilities" refers herein to the ability to apply artificial intelligence algorithms in order to autonomously manage computing resources (e.g., distributed computing resources). In an embodiment, virtual replicas with self-computing capabilities in the persistent virtual world system are able to autonomously manage computing resources to adapt to changes in the environment of corresponding real-world elements or in the real-world elements themselves. Self-managing rules and conditions may further be governed through the use of smart contracts running on blockchain or distributed ledger technologies, to further codify the rules and conditions in a distributed and transparent way. Thus, in an embodiment, each virtual replica may exhibit autonomous behavior, acting autonomously depending on the conditions in the real world reflected in the virtual world system (e.g., by allocating required resources, autonomously sending and executing commands and/or generating events as required by each circumstance). Achieving this type of behavior may require training the virtual replicas with artificial intelligence algorithms during the modeling and development of the virtual replicas. Thus, the role of a virtual replica developer may be limited to defining general policies and rules that guide the self-management process.

Figure 6:
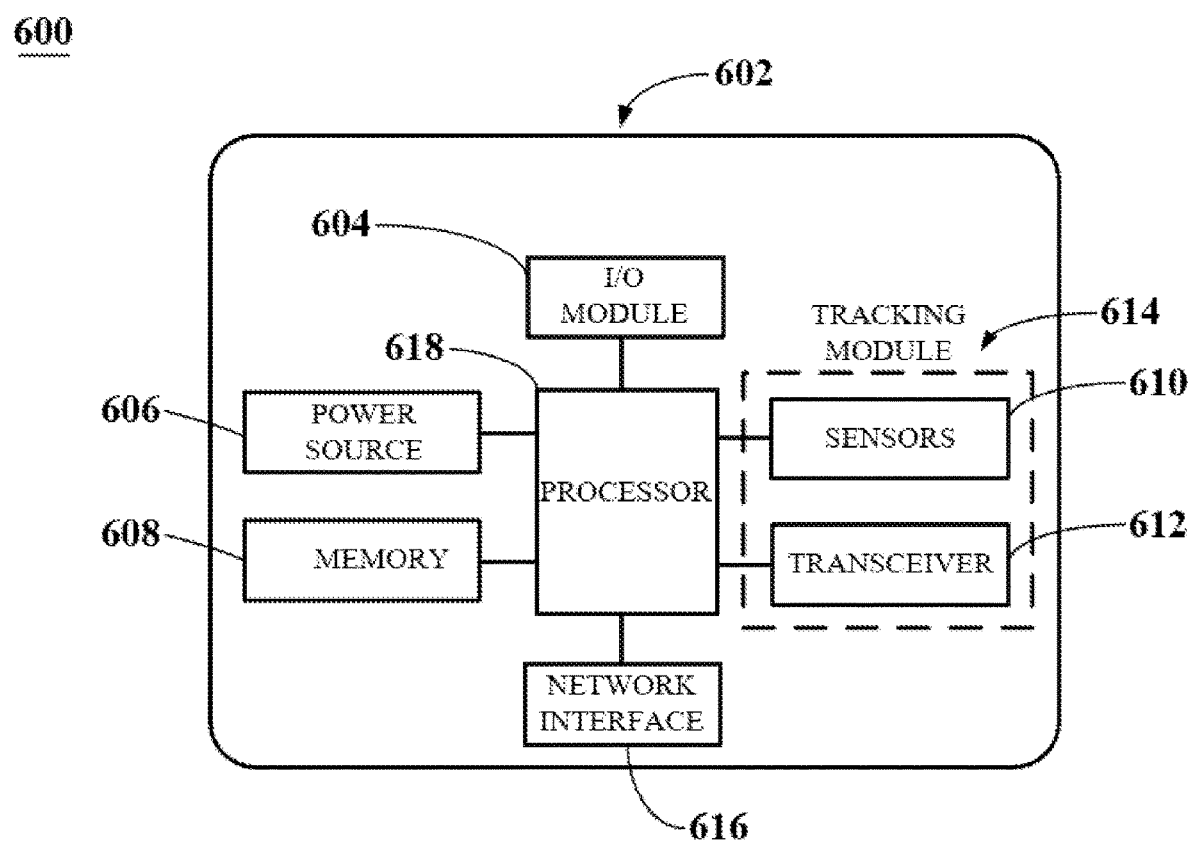
FIG. 6 depicts an operational component diagram of connected devices that may be used in a merged reality system, according to an embodiment.

FIG. 6 depicts an operational component diagram 600 of devices that may be used in a merged reality system, according to an embodiment.

A device 602 may include operational components such as an input/output (I/O) module 604; a power source 606; a memory 608; sensing mechanisms 610 and transceivers 612 forming a tracking module 614; and a network interface 616, all operatively connected to a processor 618.

The I/O module 604 is implemented as computing hardware and software configured to interact with users and provide user input data to one or more other system components. For example, I/O module 604 may be configured to interact with users, generate user input data based on the interaction, and provide the user input data to the processor 618 before being transferred to other processing systems via a network, such as to a server. In another example, I/O modules 604 is implemented as an external computing pointing device (e.g., a touch screen, mouse, 3D control, joystick, gamepad, and the like) and/or text entry device (e.g., a keyboard, dictation tool, and the like) configured to interact with other connected elements. In yet other embodiments, I/O module 604 may provide additional, fewer, or different functionality to that described above.

The power source 606 is implemented as computing hardware and software configured to provide power to the device 602. In one embodiment, the power source 606 may be a battery. The power source 606 may be built into the devices or removable from the devices, and may be rechargeable or non-rechargeable. In one embodiment, the devices may be repowered by replacing one power source 606 with another power source 606. In another embodiment, the power source 606 may be recharged by a cable attached to a charging source, such as a universal serial bus ("USB") FireWire, Ethernet, Thunderbolt, or headphone cable, attached to a personal computer. In yet another embodiment, the power source 606 may be recharged by inductive charging, wherein an electromagnetic field is used to transfer energy from an inductive charger to the power source 606 when the two are brought in close proximity, but need not be plugged into one another via a cable. In another embodiment, a docking station may be used to facilitate charging.

The memory 608 may be implemented as computing hardware and software adapted to store application program instructions and to store multi-source data captured by the sensing mechanisms 610. The memory 608 may be of any suitable type capable of storing information accessible by the processor 618, including a computer-readable medium, or other medium that stores data that may be read with the aid of an electronic device, such as a hard-drive, memory card, flash drive, ROM, RAM, DVD or other optical disks, as well as other write-capable and read-only memories. The memory 608 may include temporary storage in addition to persistent storage.

The sensing mechanisms 610 may be implemented as computing hardware and software adapted to obtain multi-source data from the real world and determine/track the position and orientation of the device 602 and, therefore, of the one or more real-world elements to which the device 602 may be linked. The sensing mechanisms 610 may include, without limitations, one or more include one or more temperature sensors, proximity sensors, inertial sensors, infrared sensors, pollution sensors (e.g., gas sensors), pressure sensors, light sensors, ultrasonic sensors, smoke sensors, touch sensors, chromatic sensors, humidity sensors, water sensors, electrical sensors, or combinations thereof. In particular, the sensing mechanisms 610 include one or more Inertia Measuring Units (IMUs), accelerometers, and gyroscopes. The IMU is configured to measure and report the velocity, acceleration, angular momentum, speed of translation, speed of rotation, and other telemetry metadata of device 602 by using a combination of accelerometers and gyroscopes. Accelerometers within the IMU and/or configured separate from the IMU may be configured to measure the acceleration of the interaction device, including the acceleration due to the Earth's gravitational field. In one embodiment, accelerometers include a tri-axial accelerometer that is capable of measuring acceleration in three orthogonal directions.

The transceivers 612 may be implemented as computing hardware and software configured to enable devices to receive wireless radio waves from antennas and to send the data back to the antennas. In some embodiments, mmW transceivers 612 may be employed, which may be configured to receive mmW wave signals from antennas and to send the data back to antennas when interacting with immersive content. The transceiver 612 may be a two-way communication transceiver 612.

According to an embodiment, the transceivers 612 enable direct communication between computing devices via a distributed ledger-based communications pipeline connected to a network. The distributed ledger-based communications pipeline may enable direct communication between device 602 through a decentralized network by allowing storage of information in a secure and accurate manner using cryptography, employing cryptographic "keys" and cryptographic signatures. In other embodiments, the distributed ledger may also be utilized between a server and a device 602, where the server may take the authority to validate data before distributing it to each device 602.

In an embodiment, the tracking module 614 may be implemented by combining the capabilities of the IMU, accelerometers, and gyroscopes with the positional tracking provided by the transceivers 612 and the accurate tracking, low-latency and high QOS functionalities provided by mmW-based antennas may enable sub-centimeter or sub-millimeter positional and orientational tracking, which may increase accuracy when tracking the real-time position and orientation of device 602. In alternative embodiments, the sensing mechanisms 610 and transceivers 612 may be coupled together in a single tracking module device.

The network interface 616 may be implemented as computing software and hardware to communicatively connect to a network, receive computer readable program instructions from the network sent by the one or more servers or by other devices, and forward the instructions for storage in the memory 608 for execution by the processor 618.

The processor 618 may be implemented as computing hardware and software configured to receive and process instructions. For example, the processor 618 may be configured to provide imaging requests, receive imaging data, process imaging data into environment or other data, process user input data and/or imaging data to generate user interaction data, perform edge-based (on-device) machine learning training and inference, provide server requests, receive server responses, and/or provide user interaction data, environment data, and content object data to one or more other system components. For example, the processor 618 may receive user input data from I/O module 604 and may respectively implement application programs stored in the memory 608. In other examples, the processor 618 may receive multi-source data from sensing mechanisms 610 captured from the real world, or may receive an accurate position and orientation of device 602 through the tracking module 614, and may prepare some of the data before sending the data to a server for further processing.

Figure 7:
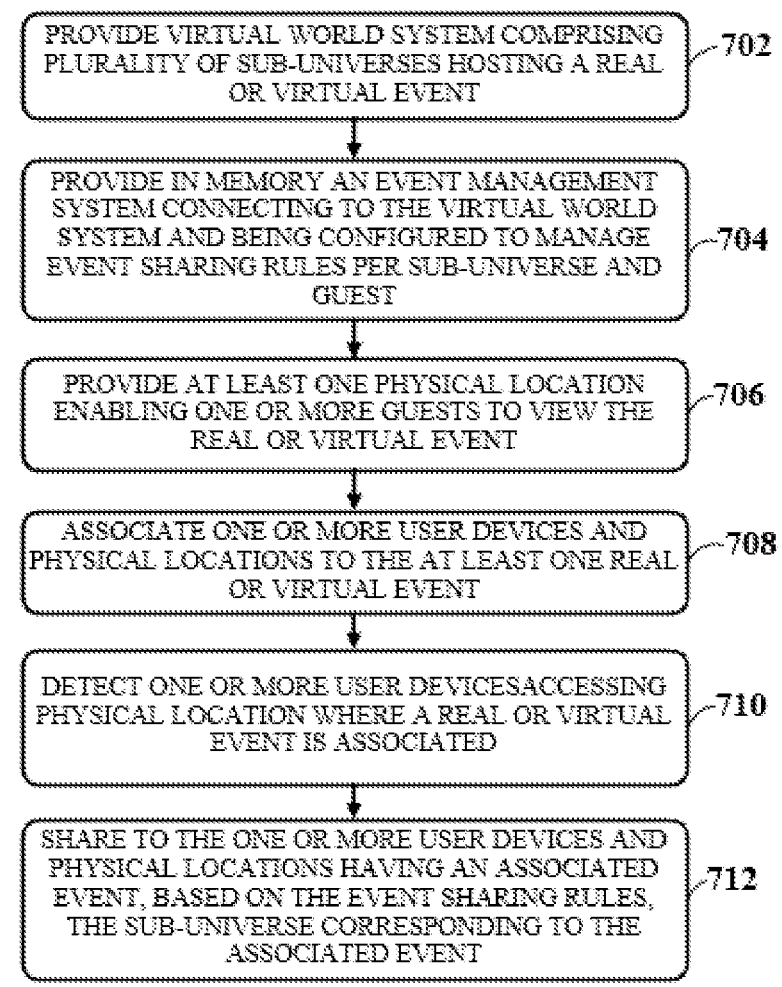
FIG. 7 depicts a block diagram of merged reality method, according to an embodiment.

FIG. 7 depicts a method 700 enabling a merged reality system. Method 700 may be implemented by a system, such as systems 100-500 described with reference to FIGS. 1-5.

Method 700 may begin in step 702 by providing a virtual world system comprising a plurality of sub-universes, each sub-universe representing at least one portion of the real world or of a virtual world, wherein at least one sub-universe hosts and is associated with a real or virtual event. Method 700 continues in step 704 by providing in memory an event management system connected to the virtual world system and being configured to manage event sharing rules on a per sub-universe basis, thereby allowing different sub-universes to have the same or different event sharing rules, as desired.

Subsequently, method 700 continues in step 706 by providing access to at least one guest physical location from where one or more guests view the real or virtual event by accessing the corresponding sub-universe through the virtual world system via a user device. Then, in step 708, method 700 proceeds by associating one or more user devices and guest physical locations with the at least one real or virtual event.

In step 710, method 700 continues by detecting one or more user devices upon a user device accessing at least one guest physical location where a real or virtual event is associated. Finally, in step 712, method 700 ends by sharing to the one or more user devices and guest physical locations having an associated event, based on the event sharing rules, the sub-universe corresponding to the event.

While certain embodiments have been described and shown in the accompanying drawings, it is to be understood that such embodiments are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

The invention claimed is:

1. A merged reality system comprising:
   at least one server of a cloud server computer system comprising at least one processor and memory storing:
   a virtual world system comprising a plurality of sub-universes, each sub-universe representing at least one portion of the real world or of a virtual world, wherein at least one sub-universe hosts a real or virtual event; and
   an event management system connected to the virtual world system and configured to manage event sharing rules on a per sub-universe basis;
   wherein the event management system is configured to:
   associate one or more user devices and one or more guest physical locations with the plurality of sub-universes,
   detect, through a network, a guest attempting to use a given user device to access a given sub-universe from a given guest physical location;

determining whether the given sub-universe is accessible from the given guest physical location, in response to determining that the given sub-universe is accessible from the given guest physical location, share with the given user device, based on the event sharing rules, a real or virtual event hosted by the given sub-universe; and in response to determining that the given sub-universe is not accessible from the given guest physical location, prevent the given user device from accessing the given sub-universe.

2. The system of claim 1, wherein the virtual world system comprises virtual objects that include at least one of a virtual replica of a real-world element, a purely virtual object, an application, or a combination thereof.

3. The system of claim 1, wherein the event management system further manages event sharing through user instances configured to process event access per guest.

4. The system of claim 1, wherein the event management system further comprises event sharing settings to configure sharing locations, times, and applications available at each sub-universe.

5. The system of claim 1, wherein the plurality of sub-universes further comprise streams representing a goal-specific simulation configured to obtain data from corresponding virtual replicas.

6. The system of claim 1, wherein the real or virtual event is a real event hosted in a real event venue, and wherein the real event venue comprises one or more connected devices including one or more RGBD cameras, depth cameras, LIDAR cameras, CCTV cameras, or Internet of Things devices, or combinations thereof, and wherein the connected devices are configured to scan and generate 3D images of the at least one portion of the real world, detect state changes in one or more objects or users, or combinations thereof.

7. The system of claim 1, wherein the at least one sub-universe hosting the real or virtual event is viewed by one or more guests in augmented or virtual reality.

8. The system of claim7, wherein in augmented reality one or more virtual objects of the real or virtual event are projected on a surface of the at least one guest physical location.

9. The system of claim 1, wherein the one or more user devices access the event through the virtual world system upon receiving an invitation from a host device to access the event.

10. The system of claim 1, wherein the at least one guest physical location has an associated digital identifier stored in the at least one server, the digital identifier being retrieved by the one or more user devices from the at least one server in order to access the associated guest physical location through the virtual world system.

11. The system of claim 10, wherein the digital identifier is retrieved by the one or more user devices upon receiving an invitation sent by the event management system to access the event.

12. The system of claim 1, wherein each of the one or more user devices has a personal identifier that enables the at least one server to identify a guest.

13. The system of claim 1, wherein the virtual world system includes a plurality of virtual objects, wherein the virtual objects include virtual data and models, and wherein the models comprise one or more of a 3D model, a dynamic model, a geometric model, or a machine learning model, or combinations thereof, and wherein the models consider a level of detail required by a specific scenario computation.

14. A method performed by at least one server computer comprising at least one processor and memory, the method comprising:

providing a virtual world system comprising a plurality of sub-universes, each sub-universe representing at least one portion of the real world or of a virtual world;

providing an event management system connected to the virtual world system and configured to manage event sharing rules on a per sub-universe basis;

associating a user device and a guest physical location with a sub-universe hosting a real or virtual event;

detecting a guest attempting to use the user device to access the sub-universe hosting the real or virtual event from the guest physical location;

determining whether the sub-universe is accessible from the guest physical location;

in response to determining that the sub-universe is accessible from the guest physical location, sharing to the user device, based on the event sharing rules, the sub-universe hosting the event; and in response to determining that the sub-universe is not accessible from the guest physical location, preventing the user device from accessing the sub-universe.

15. The method of claim 14, further comprising configuring sharing locations, times and applications available at each sub-universe through the event management system.

16. The method of claim 14, further comprising providing, through the event management system, an invitation to the user device to access the event from the guest physical location.

17. The method of claim 14, further comprising providing in the at least one server a digital identifier associated with the guest physical location, the digital identifier being retrieved by the user device from the at least one server in order to access the guest physical location through the virtual world system.

18. The method of claim 17, further comprising sending, through the event management system, a digital identifier upon the user device receiving the invitation.

19. A non-transitory computer readable medium having stored thereon instructions configured to cause at least one server computer comprising a processor and memory to perform steps comprising:

providing a virtual world system comprising a plurality of sub-universes, each sub-universe representing at least one portion of the real world or of a virtual world;

providing an event management system connecting to the virtual world system and being configured to manage event sharing rules on a per sub-universe basis;

associating a user device and a guest physical location with a sub-universe hosting a real or virtual event;

detecting a guest attempting to use the user device to access the sub-universe hosting the real or virtual event from the guest physical location;

determining whether the sub-universe is accessible from the guest physical location;

in response to determining that the sub-universe is accessible from the guest physical location, sharing to the user device, based on the event sharing rules, the sub-universe hosting the event; and in response to determining that the sub-universe is not accessible from the guest physical location, preventing the user device from accessing the sub-universe.

20. The non-transitory computer readable medium of claim 19, further comprising providing in the at least one server a digital identifier associated with the guest physical location, the digital identifier being retrieved by the user device from the at least one server in order to access the guest physical location through the virtual world system.

\* \* \* \* \*